US010527136B2

(12) United States Patent
Roch et al.

(10) Patent No.: US 10,527,136 B2
(45) Date of Patent: Jan. 7, 2020

(54) ONE-WAY DEVICE FOR TRANSMITTING MOVEMENT BY TOOTHED ELEMENTS AND KINEMATIC LINK

(71) Applicant: SOGEFI AIR & REFROIDISSEMENT FRANCE, Guyancourt (FR)

(72) Inventors: Ludovic Roch, Sigolsheim (FR); Frederic Depasse, Selestat (FR)

(73) Assignee: SOGEFI AIR & COOLING (SOCIETE PAR ACTIONS SIMPLIFIEE), Guyancourt (FR)

( * ) Notice: Subject to any disclaimer, the term of this patent is extended or adjusted under 35 U.S.C. 154(b) by 192 days.

(21) Appl. No.: 15/359,638

(22) Filed: Nov. 23, 2016

(65) Prior Publication Data

US 2017/0184186 A1    Jun. 29, 2017

(30) Foreign Application Priority Data

Dec. 29, 2015   (FR) ..................... 15 63442

(51) Int. Cl.
*F16K 31/53*     (2006.01)
*F16H 19/00*     (2006.01)
(Continued)

(52) U.S. Cl.
CPC ......... *F16H 19/001* (2013.01); *F16K 31/043* (2013.01); *F16K 31/047* (2013.01); *F16K 31/53* (2013.01); *F16K 35/00* (2013.01)

(58) Field of Classification Search
CPC ...... F16H 19/001; F16H 27/08; F16K 31/043; F16K 31/047; F16K 35/00; F16K 31/53
(Continued)

(56) References Cited

U.S. PATENT DOCUMENTS 223,806 A * 1/1880 Hodges ................... F16H 27/08
                                              74/435
290,299 A * 12/1883 White ..................... F16H 27/08
                                              74/435
(Continued)

FOREIGN PATENT DOCUMENTS

FR        2901005       11/2007
WO    WO-2015166853 A1 * 11/2015  ............... F16H 1/06

OTHER PUBLICATIONS

France Search Report FR 1563442 dated Nov. 9, 2016.

*Primary Examiner* — John Bastianelli
(74) *Attorney, Agent, or Firm* — Young & Thompson

(57) ABSTRACT

A device for transmitting movement between a first rotating and driving toothed element and a second rotating and driven toothed element, the transmitting of movement being limited to a range of rotation that is delimited by starting and ending rotational angular positions of ranges of movement for the toothed elements. The second toothed element has a spring element pulling it in rotation in a direction opposite to the positive direction of rotation bringing the second toothed element from its beginning angular position of operational range of movement to its ending angular position of operational range of movement, and the first toothed element has a particular peripheral arc portion that is devoid of teeth, this particular peripheral arc portion extending circumferentially beyond the end or the last tooth of the toothed peripheral arc portion of the first element, seen in the positive direction of rotation of the latter.

17 Claims, 6 Drawing Sheets

(51) Int. Cl.
*F16K 31/04* (2006.01)
*F16K 35/00* (2006.01)

(58) Field of Classification Search
USPC .............. 251/248, 250.5, 337; 74/425, 437
See application file for complete search history.

(56) References Cited

U.S. PATENT DOCUMENTS

| | | | | |
|---|---|---|---|---|
| 1,758,206 | A * | 5/1930 | Van Ryan | H01H 31/16 174/161 R |
| 1,846,785 | A * | 2/1932 | Breitling | F16H 19/08 235/7 R |
| 2,040,933 | A * | 5/1936 | Gillen | F16H 19/08 15/250.3 |
| 2,378,709 | A * | 6/1945 | Keen et al. | F16H 19/08 101/69 |
| 2,797,589 | A * | 7/1957 | Chaveneaud | F16H 27/08 74/435 |
| 3,813,952 | A * | 6/1974 | Fehrenbacher | F16H 27/08 74/435 |
| 3,882,735 | A * | 5/1975 | Shimodaira | B41J 1/32 101/110 |
| 3,884,088 | A * | 5/1975 | Bertozzi | A47L 15/46 74/435 |
| 4,722,239 | A * | 2/1988 | Fleck | F16H 27/08 74/435 |
| 4,838,226 | A | 6/1989 | Matsuzawa et al. | |
| 5,595,287 | A * | 1/1997 | Niklaus | H01H 3/30 200/400 |
| 5,944,305 | A * | 8/1999 | Takashima | G03G 15/6511 271/118 |
| 6,244,564 | B1 * | 6/2001 | Noritake | F16K 31/043 251/129.11 |
| 6,571,655 | B2 * | 6/2003 | Tanaka | F16H 55/0806 74/457 |
| 7,581,463 | B2 * | 9/2009 | Jacobs | F16H 19/08 74/406 |
| 8,561,495 | B2 * | 10/2013 | Trischberger | B60R 25/02 74/435 |
| 2016/0341331 | A1 * | 11/2016 | Lueders | F16K 11/165 |
| 2017/0045283 | A1 * | 2/2017 | Saito | F16H 1/06 |

* cited by examiner

ONE-WAY DEVICE FOR TRANSMITTING MOVEMENT BY TOOTHED ELEMENTS AND KINEMATIC LINK

FIELD OF THE INVENTION

This invention relates to the field of the transmitting of movement, of torque, of power with respect to geared devices, preferably with simultaneously supplying a reduction gear ratio, and has as its object a device for transmitting movement by gearing with a safety position, as well as a system for control, distribution and/or regulation of the rate of the flow of a fluid that integrates such a device.

BACKGROUND OF THE INVENTION

The devices of the above-cited type are particularly known and used in the context of regulating the flow of fluid (flow rate, distribution, orientation) to transmit, with gear reduction, a torque or a movement between an active means of actuation (input shaft; electric, pneumatic, hydraulic actuator) and at least one regulating and/or distribution element such as a valve or the like, which is optionally multi-path.

These regulating elements generally exhibit a state or a safety position corresponding to an adjustment of the flow rate or a distribution configuration of the element protecting the components, modules, circuits or the like that are fed or traversed by the fluid concerned.

Various devices able and designed to avoid an abnormal configuration or positioning, or to force the regulating element into a safety position, are already known and used.

Thus, actuators are known that integrate or are directly associated with elastic means that act on the drive shaft of the actuator to bring it or to bring it back by default to an initial position.

Also, means of the return spring type are known that are able and designed to act on an intermediate component of a drive train for transmitting movement between an actuator and an actuated element, to bring back the latter automatically into a safety position when certain conditions are validated or are no longer validated, or when a malfunction or an abnormal situation is identified. The documents FR 2 839 164 and FR 2 901 005, for example, disclose such solutions.

However, in the above-cited known solutions, the elastic or spring means must be able to supply a return torque or a force that is sufficient to drive not only the element with which it is associated, but also all of the components of the drive train and the actuator. The result of this is a high cost for the production of this safety function and therefore the necessity either of oversizing the actuator considerably to overcome, in normal operation, the unwanted action (reverse bias) of the return means constantly, or of providing an additional retaining means in normal operation and of conditional release of said return means, driving a structural complexity and a more considerable bulk.

SUMMARY OF THE INVENTION

This invention has as its object to remedy at least the principal drawbacks of the above-cited existing solutions, in particular in terms of costs, of constructive complexity, and of bulk.

For this purpose, the invention has as its object a device for transmitting movement by kinematic link with driving between a first rotating and driving toothed element and a second rotating and driven toothed element, the transmitting of movement being limited to a range of rotation that is determined for at least one of the two elements, which correspond to a fraction of rotation for said or each of said elements, as well as to respective operational ranges of movement for the latter, and which are delimited by starting and ending rotational angular positions of ranges of movement for said first and second toothed elements, the kinematic link with driving being obtained, over the extent of the above-cited operational ranges of movement, by mutual meshing of toothed peripheral arc portions of respectively corresponding angular extensions of said first and second toothed elements, these toothed peripheral arc portions each exhibiting first and last respective teeth, device characterized in that the second toothed element has or is operationally combined with a spring or elastic means pulling it in rotation in a direction opposite to the positive direction of rotation that brings said second toothed element from its starting angular position of operational range of movement to its ending angular position of operational range of movement, and in that the first toothed element has a particular peripheral arc portion that does not make possible the establishment of a kinematic link with driving with the second toothed element, preferably that is devoid of teeth, this particular peripheral arc portion extending circumferentially beyond the end or the last tooth of the toothed peripheral arc portion of said first element, seen in the positive direction of rotation of the latter.

BRIEF DESCRIPTION OF THE DRAWINGS

The invention will be better understood, thanks to the description below, which relates to preferred embodiments, given by way of nonlimiting examples, and explained with reference to the accompanying schematic drawings, in which.

DETAILED DESCRIPTION OF THE INVENTION

Figure 1A:
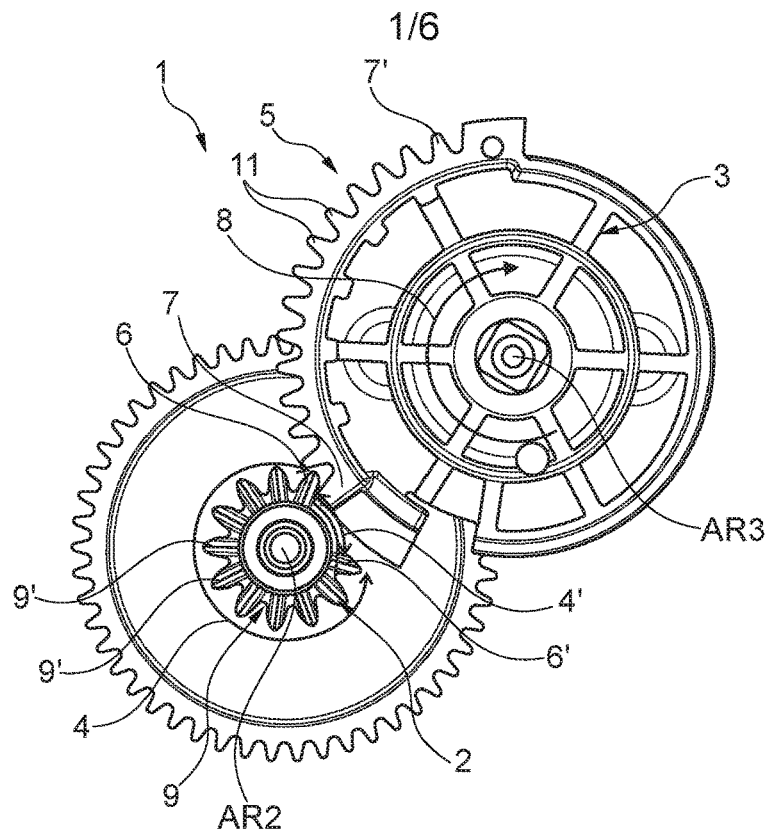
FIGS. 1A to 1D are front elevation views (in the direction of the axes of rotation of the toothed elements) of the two essential constituent components of the device for transmitting movement according to a first embodiment of the invention, these figures illustrating the device in several configurations corresponding to different relative positions between the two toothed elements (1A: start of the gearing and of the operational range of movement of the device/1B: configuration of the device after a rotation of 10° of the second toothed element/1C: configuration of the device after a rotation of 90° of the second toothed element/1D: configuration of the device just after disengagement and start of the return movement)
Figure 1B:
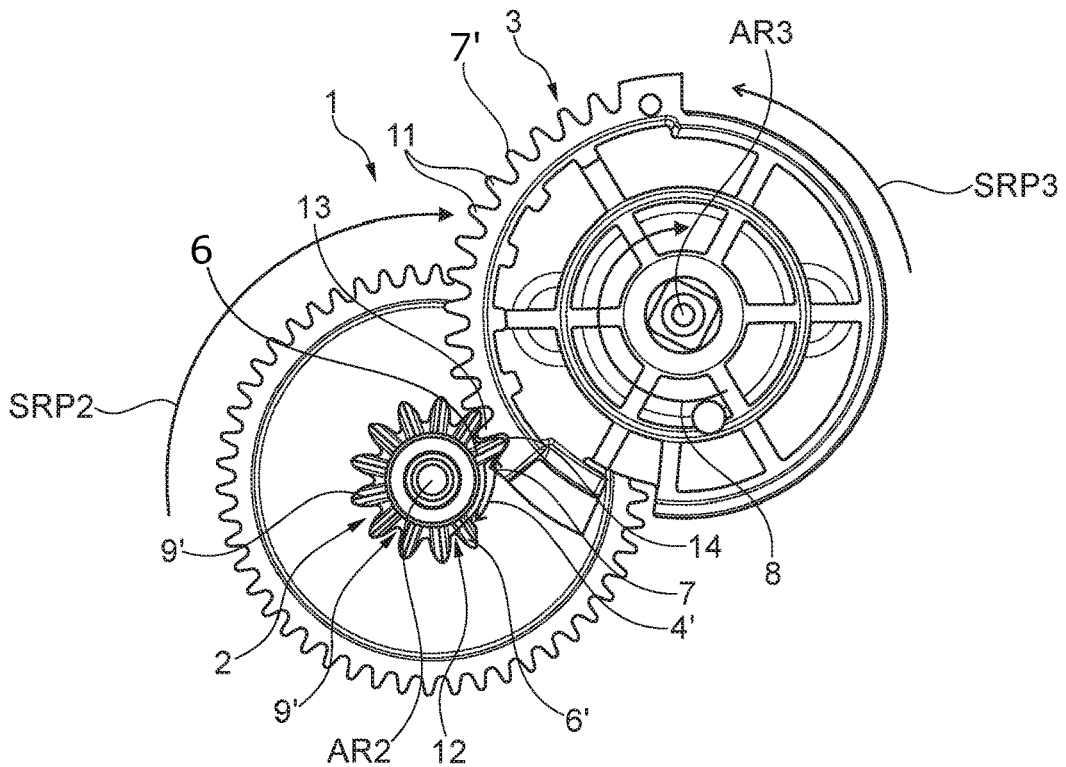
Figure 1C:
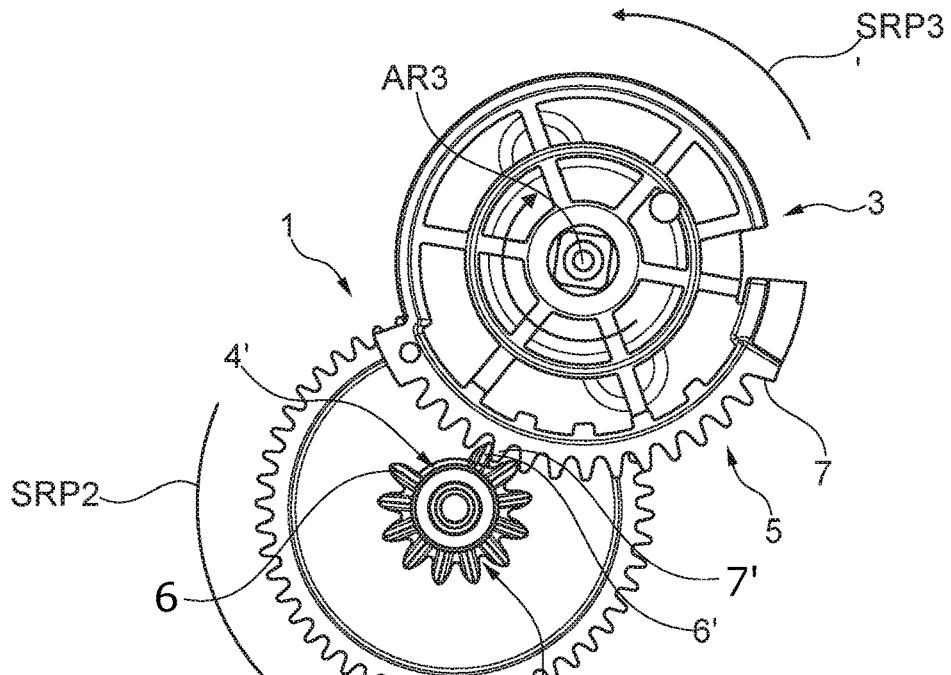
Figure 1D:
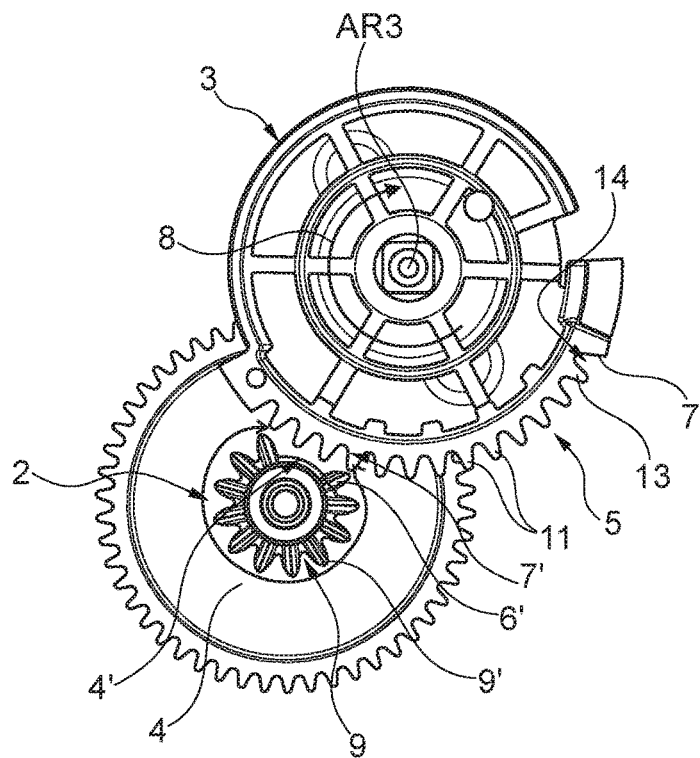
Figure 2:
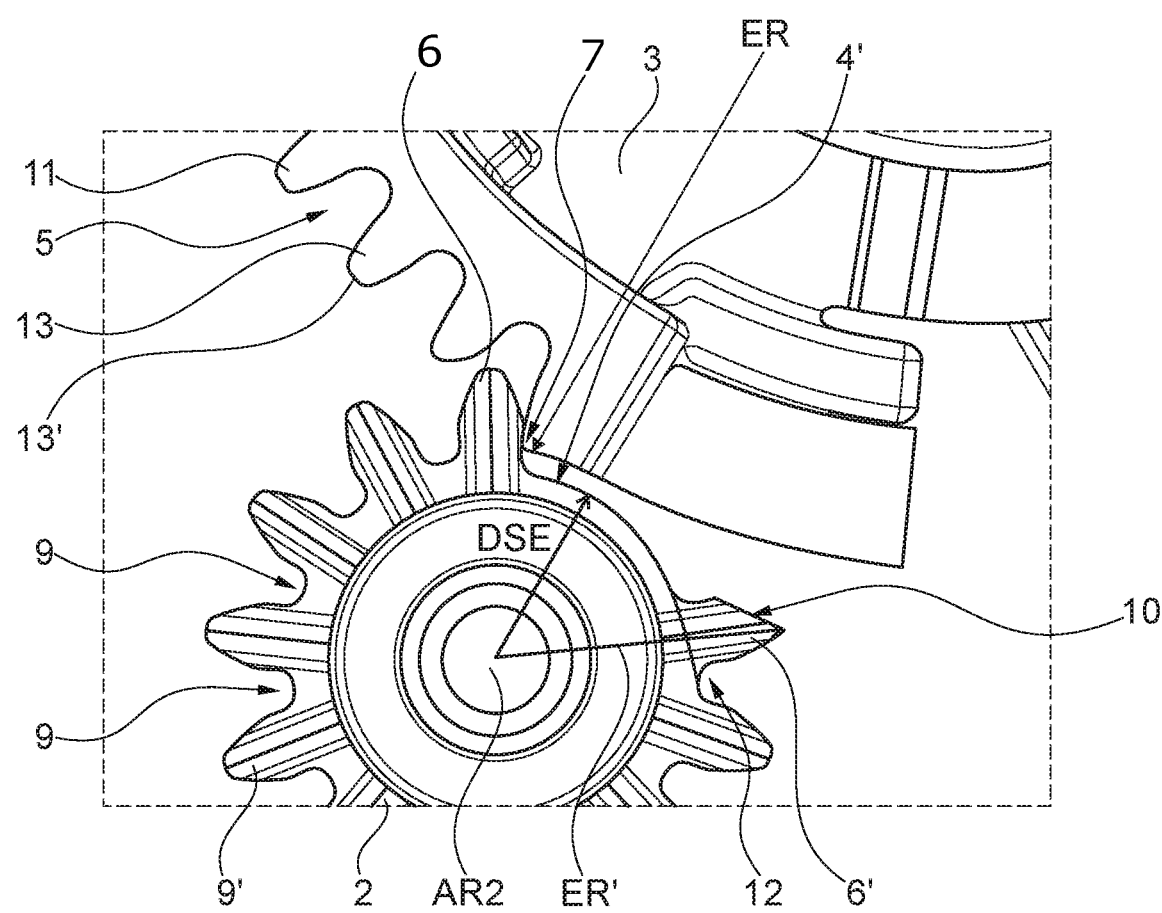
FIG. 2 is a detail view, on a different scale, of the gearing zone between the two elements, at the start of the operational range of movement (detail of FIG. 1A)
Figure 3:
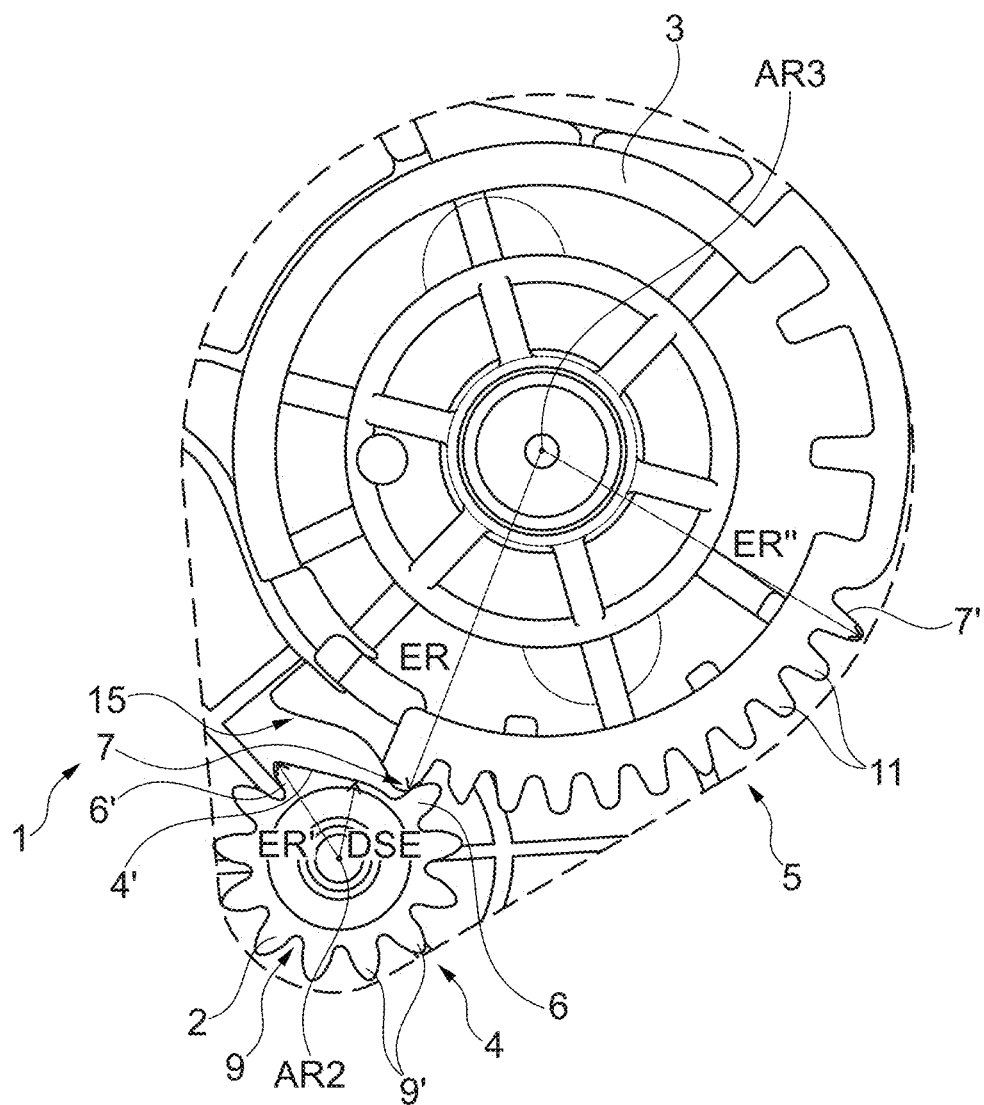
FIG. 3 is a front elevation view, similar to FIG. 1A, but in an opposite direction, of another embodiment of the device according to the invention, in a configuration corresponding to the start of the operational range of movement.
Figure 4A:
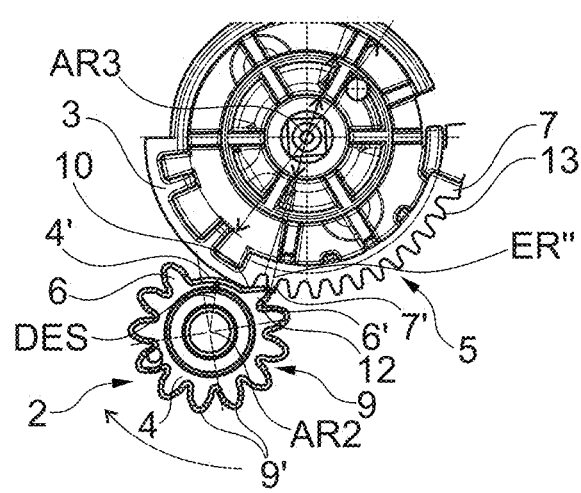
FIGS. 4A and 4B are partial views, on a different scale, of the object represented in FIG. 3, just before the start and after the end of the return movement of the second toothed element respectively.
Figure 4B:
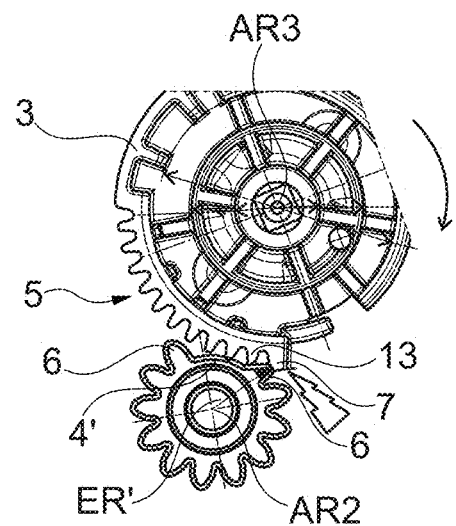
Figure 4C:
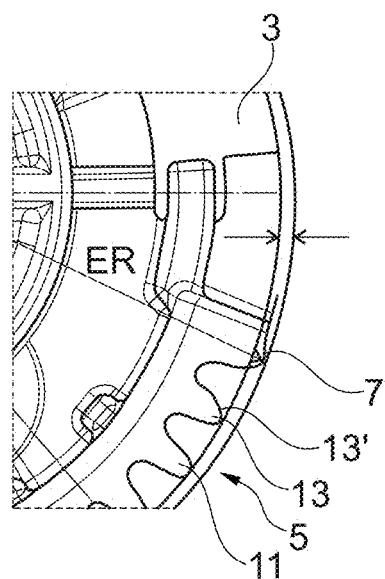
FIG. 4C is a detail view of a part of the second toothed element represented in FIGS. 4A and 4B, and, FIG. 5 is a side elevation cutaway view of an actuation system of a valve comprising a device for transmitting movement according to the invention.
Figure 5:
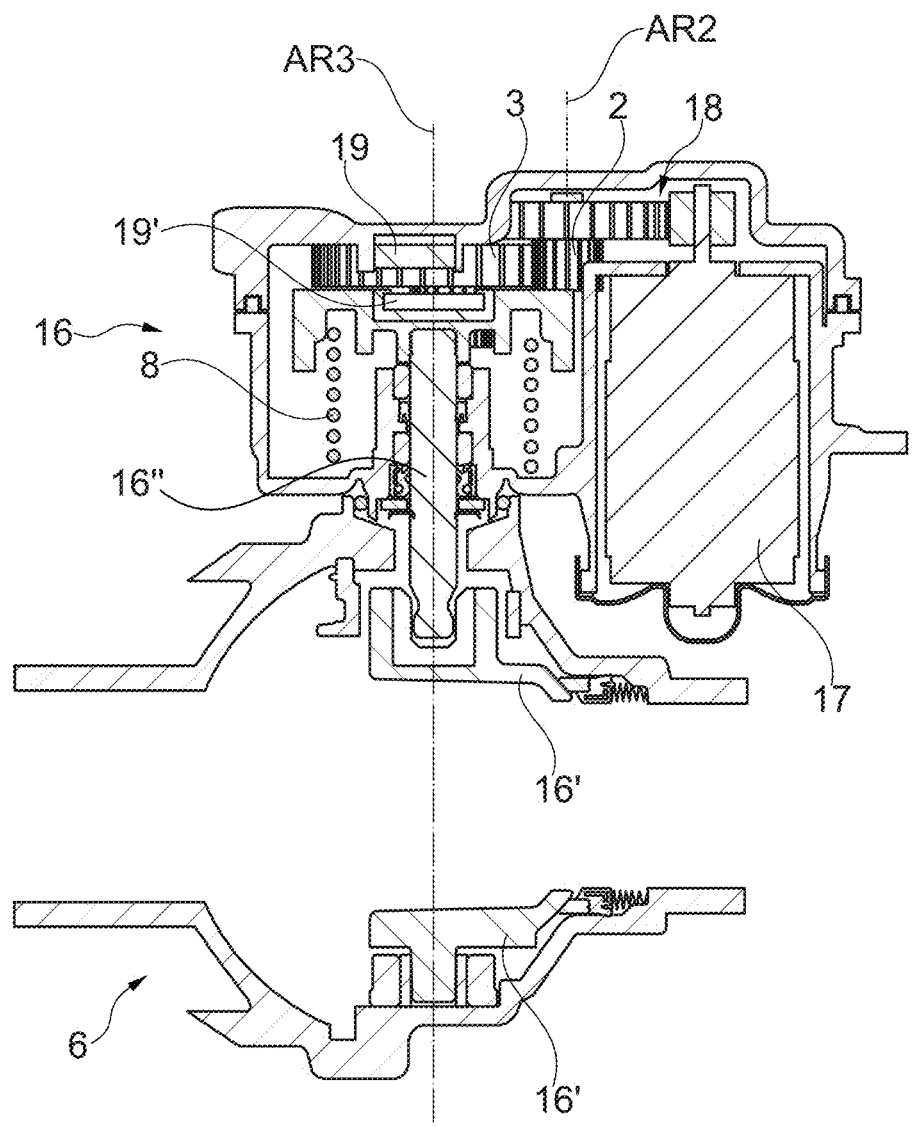

FIGS. 1, 3 and 5, and partially FIGS. 2 and 4, illustrate a device 1 for transmitting movement by kinematic link with driving between a first rotating and driving toothed element 2 and a second rotating and driven toothed element 3, the transmitting of movement being limited to a range of rotation that is determined for at least one of the two elements 2 and 3 (this as a function particularly of their relative size and of the gear ratio to be achieved between them).

These respective ranges of rotation correspond to a fraction of rotation for said element or each of said elements 2, 3, as well as to respective operational ranges of movement for the latter, and are delimited by starting and ending rotational angular positions of ranges of movement for said first and second toothed elements 2 and 3. The kinematic link with driving is obtained, over the extent of the above-cited operational ranges of movement, by mutual meshing of toothed peripheral arc portions 4 and 5 of respectively corresponding angular extensions of said first and second toothed elements 2 and 3, these toothed peripheral arc portions 4 and 5 each exhibiting respective first teeth 6, 7 and last teeth 6', 7'.

The axes of rotation AR2 and AR3 of the two toothed elements 2 and 3 are preferably parallel to one another, and the two toothed elements 2 and 3 advantageously have circular shapes, although a disk-sector shape can also be suitable for the second toothed element 3.

According to the invention, the second toothed element 3 has or is operationally combined with a spring or elastic means 8 pulling it in rotation in a direction opposite to the positive direction of rotation SRP3 that brings said second toothed element 3 from its starting angular position of operational range of movement to its ending angular position of operational range of movement. Moreover, the first toothed element 2 has a particular peripheral arc portion 4' that does not make possible the establishment of a kinematic link with driving with the second toothed element 3, preferably that is devoid of teeth, this particular peripheral arc portion 4' extending circumferentially beyond the end or the last tooth 6' of the toothed peripheral arc portion 4 of said first element 2, seen in the positive direction of rotation SRP2 of the latter.

A person skilled in the art understands that, thanks to the above-cited arrangements of the invention, the device 1 incorporates an automatic return function (represented diagrammatically by the arrow referenced 8 in FIGS. 1A to 1D), which is activated by simple rotation of the first toothed element 2 beyond its operational range of movement.

More specifically, this deliberate excessive rotation (corresponding to, for example, a so-called safety position) in fact causes a disengagement between the first toothed element 2 and the second toothed element 3 and, under the effect of the return means 8 (see FIGS. 1 and 5), which is adequately calibrated, said second element 3 is automatically brought back by reverse rotation (relative to the direction SRP3) to its starting position of operational range of movement, simultaneously driving all of the components that are kinematically connected to it and located downstream.

Nevertheless, the above-cited disengagement, by kinematically separating the elements 2 and 3 from one another, prevents means 8 from having also to drive the first element 2 and the optional components of the kinematic chain extending upstream from this element 2 (and comprising, for example, an actuator 17), and thus makes it possible to limit the size of said means 8.

Furthermore, with the exception of a limited adaptation of the embodiment of the first toothed element 2 and of the provision of the return means 8, the embodiment of the above-cited safety function results in neither a significant constructive modification of the transmission device 1 that comprises the two elements 2 and 3, nor an increase in its bulk (the means 8 being able to be easily incorporated or associated closely with the second toothed element 3).

In accordance with an advantageous characteristic of the invention, which makes possible in particular an embodiment of small size of the first toothed element 2, it is envisaged that the toothed peripheral arc portion 4 and the particular peripheral arc portion 4' have complementary circumferential extensions and together cover the periphery of the first toothed element 2, the suppressing of the kinematic link with driving being effective upon the disengagement of the latter respective teeth 6' and 7' of the toothed peripheral arc portions 4 and 5 of the first and second elements 2 and 3, or last teeth, marking the end of the respective operational ranges of movement of the latter.

It can be envisaged that the toothed peripheral arc portion 5 has more teeth 11 and a linear extension that is more significant than the toothed peripheral arc portion 4. In this case, some of said teeth 11 never mesh with the teeth 9' of said portion 4, but a certain freedom of adjustment in rotation between the two elements 2 and 3 is available (FIGS. 1A to 1D).

Nevertheless, as FIG. 3 illustrates, the number of teeth and the linear extension of the portions 4 and 5 are preferably, but not necessarily, similar.

The end position of the return movement of the second toothed element 3, provided by the means 8, can be determined by a particular stop system, the two toothed peripheral arc portions 4 and 5 of the two elements 2 and 3 starting their mutual meshing (start of the operational ranges of movement) following an initial displacement of the first toothed element 2 that engages the first teeth 6 and 7.

However, in accordance with a very advantageous variant embodiment of the invention, as shown in particular in FIGS. 1, 2 and 3, the toothed peripheral arc portion 4 and the particular peripheral arc portion 4' of the first toothed element 2 have respective circumferential extensions such that the end of the free rotation movement of the second toothed element 3—movement carried out under the action of the elastic or spring means 8 and initiated after exceeding, in their respective positive directions of rotation SRP2 and SRP3, rotational angular positions of the two toothed elements 2 and 3 that correspond to the end of the operational range of movement of the device 1—is determined by the engaging of the respective teeth 6 and 7 of the toothed peripheral arc portions 4, 5 of said first 2 and second 3 elements, or first teeth, marking the start of the operational ranges of movement of the latter.

Thus, as the three above-cited figures show, the shape of the last tooth 6' and the extent of the particular peripheral arc portion 4' are such that, in the rotational position of the first toothed element 2 that corresponds to the triggering of the disengagement between the latter and the second toothed element 3, the first tooth 6 of the first toothed element 2 extends inside the virtual circle that is associated with said second toothed element 3 and that passes by the top of the first tooth 7 of the latter. Furthermore, no additional movement of the first toothed element 2 is necessary to recover the configuration of the device 1 corresponding to the start of the operational range of movement.

So as to prevent, during the return rotation movement of the second toothed element 3 under the action of the means 8, the teeth 11 of the toothed peripheral arc portion 5 from becoming worn by friction, even from being blocked, against the first toothed element 2, the latter advantageously has at its particular peripheral arc portion 4' an exterior surface whose distance DSE to the axis of rotation AR2 of said first element 2 is at most equal to that of the tooth bottoms or standard hollows 9 of the latter relative to this axis AR2. The desired purpose is to reduce and if possible to prevent any contact between the standard teeth 11 of the second element 3 and the surface of the arc portion 4' that is devoid of teeth of the first element 2 during the return movement actuated by the means 8.

According to another characteristic of the invention, which makes it possible to guarantee (taking into account the mounting tolerances) and to facilitate the reengagement of the two toothed elements 2 and 3 and simultaneously to limit more the risk of wear connected with friction during the return movement, the first tooth 7 of the toothed peripheral arc portion 5 of the second element 3 has a height or radial extension ER relative to the axis of rotation AR3 of said second element 3 that is greater than the other standard teeth 11 of this element 3 (FIGS. 2 and 4C).

To limit the extension of the peripheral arc portion 4' that is devoid of teeth (and therefore the size of the element 2), while guaranteeing an adequate positioning of the first tooth 6 for the reengagement, the shape and the dimensions of the last tooth 6' of the first toothed element 2 can be optimized.

Thus, it can be envisaged that the last tooth 6' of the toothed peripheral arc portion 4 of the first element 2 has a height or radial extension ER' that is less than that of the other standard teeth 9' of said first element 2 and has, on the side turned toward the peripheral arc portion 4' that is devoid of teeth, a flat or concave edge 10 that comes out on the latter (FIGS. 2, 3, 4A and 4B).

Moreover, since this last tooth 6' is pulled only in rare and exceptional cases, its implementation quality level in terms of strength and of covering can be kept low.

According to another characteristic of the invention, also working in favor of a limitation of a friction risk between the two toothed elements 2 and 3 during the return movement of the second element 3, it can be envisaged that the last tooth 7' of the toothed peripheral arc portion 5 of the second element 3 has a height or radial extension ER" that is greater than the other standard teeth 11 of said second element 3, the tooth bottom or hollow 12 that precedes the last tooth 6' of the toothed peripheral arc portion 4 of the first element 2 having a shape and a specific depth or specific radial hollow that are suitable (FIGS. 1, 3, 4A and 4B).

To facilitate the reengagement additionally, it can further be envisaged, as FIGS. 2 and 3 show, that the second tooth 13 of the toothed peripheral arc portion 5 of the second element 3, which defines in cooperation with the first tooth 7 the first hollow or tooth bottom 14 of said toothed peripheral arc portion 5, has at its top, on its edge turned toward said first hollow or tooth bottom 14, a bevel or chamfer 13', which defines a flat or concave surface.

In accordance with the embodiment represented in FIG. 3, the second toothed element can have, upstream from the first tooth 7 of its toothed peripheral arc portion 5, i.e., located circumferentially beyond this first tooth 7 in the direction opposite to the positive direction of rotation SRP3 of said second toothed element 3, a hollow or radially recessed surface 15 that provides a disengaged zone able to absorb a possible bounce-back of the first toothed element 2 following the mutual engagement by impact of the first teeth 6 and 7 of the toothed peripheral arc portions 4 and 5 of the first and second elements 2 and 3 at the end of free rotating movement under the action of the elastic means 8, such as, for example, a spring under stress, after mutual disengagement of said elements 2 and 3 beyond their respective operational ranges of movement.

Of course, the size of the first and second toothed elements and of their axes and the materials (plastic, metal) used for their production depend on the use foreseen and particularly the torque to be transmitted and provided.

In terms of practical construction, it is nevertheless preferable, as comes out schematically from the accompanying figures, that the toothed peripheral arc portion 5 of the second element 3 extends circumferentially over a limited fraction of the periphery of the latter, advantageously at most over 180°, preferably over about 90°, and that the particular peripheral arc portion 4', preferably devoid of teeth, of the first toothed element 2 extends angularly over at least 60°, preferably over about at least 90°.

Furthermore, and in particular in the preferred applications of the device 1 that are targeted by the invention (driving of an element 16' for control/regulation of the circulation of a fluid by means of an actuator 17), the gear ratio between the first toothed rotating element 2 and the second toothed rotating element 3 is less than ½, preferably between ⅓ and ⅕.

Of course, each of the two toothed elements 2 and 3 can either be part of a group of several toothed elements (particularly be made of a single piece with another toothed element of different diameter), or be mounted on a drive shaft, or else both above-cited embodiments combined.

The object of the invention is also, as shown by way of example in FIG. 5, an actuation system of a device 16 for control, distribution and/or regulation of the flow of a gaseous or liquid fluid, such as a gate valve, slide valve, flap valve or the like, comprising a device 1 for transmitting movement by gearing, preferably with a gear ratio other than 1, with a first rotating and driving toothed element 2 and a second rotating and driven toothed element 3, the first element 2 being integral with a drive shaft AR2, if applicable the output shaft of an actuator or of a gear motor assembly 18, and the second element 3 being integral with a driven shaft AR3, if applicable the support and guiding shaft of an active element 16' of the device 16 for control, distribution and/or regulation.

According to the invention, the first and second toothed rotating elements 2 and 3 together form a device for transmitting movement 1 as previously described.

According to an advantageous embodiment, also as shown in FIG. 5, the first toothed element 2 consists of an output pinion of an actuator or of a gear motor assembly 18 that incorporates an actuator 17, and the second toothed element 3 consists of a wheel that is directly integral with the support and guiding shaft AR3 of the active element 16' of the driven device for control, distribution and/or regulation 16, said wheel 3 having a toothed sector 5 that extends over an arc portion of the periphery of this wheel, optionally in the form of an added part.

Preferably, the system can correspond to a complete functional module and then also comprises an actuator 17, preferably rotating and of electric type, and a means for driving said actuator 17 that is able and intended, in response to a default or malfunction signal, to drive the actuator 17 in such a way that the first and second toothed rotating elements 2 and 3 are brought beyond their operational range of movement.

As FIG. 5 shows, the device 16 can, for example, consist of a rotating gate valve 16' that has a construction, in particular a drive shaft 16" and sealing means, as described and shown in the document EP-A-2 910 826.

The rotating position of the gate or flap 16' can, for example, be identified by means of a sensor 19 that detects the angular position of a magnetic marker 19' that is integral with said gate or flap, or with its drive shaft 16".

As shown by way of illustrative example in FIG. 5 and according to a preferred construction of the invention, the above-cited system constitutes a drive device by gearing of a gate valve 16 for a cooling system of an internal combustion engine, comprising:

a first assembly of toothed wheels (the first element 2 and the toothed wheels being part of the gear motor 18) connected kinematically to the ouput shaft of the actuator 17 and a second toothed wheel assembly (the second element 3 and an optional toothed pinion meshing with it and integral with the drive shaft 16" of the gate or flap 16') connected kinematically to the rotating shaft of the gate, and an electric actuator 17 that drives in rotation the gearing formed by the two above-cited assemblies, against a spring means 8 (acting on the second assembly of toothed wheels), over a given range between a first and a second position.

According to the invention, the electric actuator 17 positions the gearing beyond its normal operational range in case of malfunction (mechanical, etc.) to disengage the first and the second assembly of toothed wheels and to bring the second assembly of toothed wheels back into its initial position (gate in its initial or safety position) by the sole return force of the spring 8 (the first assembly of toothed wheels not being driven by the spring), the first assembly of toothed wheels being uncoupled from the first assembly.

Thus, a safety position is reached by a positioning of the gears beyond the normal rotating range of the latter (corresponding to the normal pivoting of the gate). In this position, the gear system is in a configuration that is mutually disengaged from its two constituent assemblies, and it is a return system, typically a prestressed spring that brings the gear system back into its initial position.

The advantage of the invention is to eliminate all of the forces that would aim to oppose the return force of the spring means 8, since during the return of the intermediate gearing under the effect of the return spring, the former does not engage the adjacent output toothed wheel 2. Thus, the risks of aging of the parts (spring, gearing, ... ) are limited, and it is not necessary to oversize the means 8 or the actuator 17 (which counters the action of the means 8 in normal operation).

Finally, the invention also relates to a method for driving an actuating system as described above comprising a device for transmitting movement 1 as described above, an actuator 17 and a means for driving the latter (not shown).

This method is characterized in that it consists, in the case of supplying a default or malfunction signal, in driving the actuator 17, by way of the driving means, in such a way that the first and second toothed rotating elements 2 and 3 of the device for transmitting movement 1 are brought beyond their operational range of movement, causing a disengaging between them.

Of course, the invention is not limited to the embodiments described and shown in the accompanying drawings. Modifications remain possible, particularly from the standpoint of the makeup of the various elements or by substitution of technical equivalents, without thereby going outside of the field of protection of the invention.

The invention claimed is:

1. A one-way transmitting device for transmitting movement between a first toothed element and a second toothed element, the transmitting device comprising:

the first toothed element being a first rotating and driving toothed element;

the second toothed element being a second rotating and driven toothed element; and a kinematic link with one-way driving between the first toothed element and the second toothed element, the transmitting of movement being limited to a range of rotation that is determined by at least one of: i) a range of rotation of the first toothed element and ii) a range of rotation of the second toothed element, wherein the ranges of rotation of said first and second toothed elements correspond to a fraction of rotation for at least one of the first toothed element and the second toothed element, as well as to respective operational ranges of movement for the first and second toothed elements, the ranges of rotation of said first and second toothed elements being delimited by starting and ending rotational angular positions of ranges of movement for said first and second toothed elements, the kinematic link with driving being obtained, over the extent of operational ranges of movement of the first and second toothed elements, by mutual meshing of toothed peripheral arc portions of respectively corresponding angular extensions of said first and second toothed elements, the toothed peripheral arc portions each exhibiting respectively a first tooth and a last tooth, the second toothed element (3) having or being operationally combined with a spring or elastic means (8) pulling the second toothed element (3) in rotation in a direction opposite to the positive direction (A) of rotation (SRP3) that brings said second toothed element (3) from a starting angular position of the second toothed element's (3) operational range of movement to an ending angular position of the second toothed element's (3) operational range of movement, the first toothed element (2) having a first peripheral arc portion (4') that prevents establishment of a kinematic link with driving with the second toothed element (3) and provides kinematical separation between both the first and second toothed elements (2, 3), wherein the first peripheral arc portion (4') extends circumferentially beyond either an end or the last tooth (6') of the toothed peripheral arc portion (4) of said first toothed element (2), as seen in the positive direction (A) of rotation (SRP2) of the said first toothed element (2), wherein the toothed peripheral arc portion (4) and the first peripheral arc portion (4') together cover all of the periphery of the first toothed element (2), the prevention of the kinematic link with driving and the kinematic separation being effective upon the disengagement of the last respective teeth (6', 7') of the toothed peripheral arc portions (4, 5) of the first and second toothed elements (2, 3), marking the end of the respective operational ranges of movement, wherein the first tooth (7) of the toothed peripheral arc portion (5) of the second toothed element (3) has a radial extension height (ER) relative to the axis of rotation (AR3) of said second toothed element (3) that is greater than a corresponding radial extension height of each of the other current teeth (11) of the second toothed element (3), wherein the last tooth (6') of the toothed peripheral arc portion (4) of the first toothed element (2) has a radial extension height (ER') that is less than a corresponding radial extension height of each of the other current teeth (9') of said first toothed element (2), and wherein the last tooth (6') of the toothed peripheral arc portion (4) of the first toothed element (2) has, on its side turned toward the first peripheral arc portion (4') that is devoid of teeth, a flat or concave edge (10) that is inclined towards said first peripheral arc portion (4').

2. The transmitting device according to claim 1, wherein the toothed peripheral arc portion (4) and the first peripheral arc portion (4') of the first toothed element (2) have respective circumferential extensions such that the end of the free rotation movement of the second toothed element (3), movement carried out under the action of the elastic or spring means (8) and initiated after exceeding, in the respective positive directions of rotation (SRP2 and SRP3), rotational angular positions of the first and second toothed elements (2, 3) that correspond to the end of the operational range of movement of the device (1), is determined by the engaging of the respective teeth (6, 7) of the toothed peripheral arc portions (4, 5) of said first and second toothed elements, or first teeth, marking the start of the operational ranges of movement.

3. The transmitting device according to claim 1, wherein the first toothed element (2) has, at the first peripheral arc portion (4'), an exterior surface whose distance (DSE) to the axis of rotation (AR2) of said first toothed element (2) is at most equal to that of the tooth bottoms or standard hollows (9) of the first toothed element (2) relative to this axis (AR2).

4. The transmitting device according to claim 1, wherein the last tooth (7') of the toothed peripheral arc portion (5) of the second toothed element (3) has a radial extension height (ER") that is greater than the other standard teeth (11) of said second toothed element (3), the tooth bottom or hollow (12) that precedes the last tooth (6') of the toothed peripheral arc portion (4) of the first toothed element (2) having a shape and a specific depth or specific radial hollow that are suitable.

5. The transmitting device according to claim 1, wherein the second tooth (13) of the toothed peripheral arc portion (5) of the second toothed element (3), which defines in cooperation with the first tooth (7) the first hollow or tooth bottom (14) of said toothed peripheral arc portion (5), has at a top thereof, on an edge turned toward said first hollow or tooth bottom (14), a bevel or chamfer (13'), which defines a flat or concave surface.

6. The transmitting device according to claim 1, wherein the second toothed element (3) has a hollow or radially recessed surface (15) that provides a disengaged zone able to absorb a possible bounce-back of the first toothed element (2) following the mutual engagement by impact of the first teeth (6, 7) of the toothed peripheral arc portions (4, 5) of the first and second toothed elements (2, 3) at the end of free rotating movement under the action of the spring or elastic means (8), a spring under stress, after mutual disengagement of said first and second toothed elements (2, 3) beyond the respective operational ranges of movement of the first and second toothed elements (2, 3).

7. The transmitting device according to claim 1, wherein the toothed peripheral arc portion (5) of the second toothed element (3) extends circumferentially over a limited fraction of the periphery of the second toothed element (3), and the first peripheral arc portion (4') of the first toothed element (2) extends angularly over at least 60°.

8. The transmitting device according to claim 1, wherein the gear ratio between the first toothed element (2) and the second toothed element (3) is less than ½.

9. A system for actuating a device for control, distribution and/or regulation of the flow of a gaseous or liquid fluid, including a gate valve, slide valve, and flap valve, comprising a device for transmitting movement by gearing, with a gear ratio other than 1, with a first toothed element and a second toothed element, the first toothed element being integral with a drive shaft, the output shaft of an actuator or of a gear motor assembly, and the second toothed element being integral with a driven shaft, the support and guiding shaft of an active element of the device for control, distribution and/or regulation, wherein the first and second toothed elements (2, 3) together form a device for transmitting movement (1) according to claim 1.

10. The system according to claim 9, wherein, the first toothed element (2) comprises an output pinion of an actuator or of a gear motor assembly (18) that incorporates an actuator (17), and the second toothed element (3) comprises a wheel that is directly integral with the support and guiding shaft (AR3) of the active element (16') of the driven device for control, distribution and/or regulation (16), said wheel (3) having a toothed sector (5) that extends over an arc portion of the periphery of the wheel.

11. The system according to claim 9, further comprising an actuator (17), and a means for driving said actuator (17) that is able and intended, in response to a default or malfunction signal, to drive the actuator (17) in such a way that the first and second toothed elements (2, 3) are brought beyond their operational range of movement.

12. A method for driving an actuating system according to claim 9, comprising an actuator and a means for driving the actuator, the method comprising, when supplying a default or malfunction signal, driving the actuator (17), by way of the driving means, in such a way that the first and second toothed elements (2, 3) of the device for transmitting movement (1) are brought beyond their operational range of movement, causing a disengaging between the first and second toothed elements (2, 3).

13. The transmitting device according to claim 1, wherein the first peripheral arc portion (4') of the first toothed element (2) that prevents establishment of a kinematic link with driving with the second toothed element (3) is devoid of teeth.

14. The transmitting device according to claim 1, wherein the toothed peripheral arc portion (5) of the second toothed element (3) extends circumferentially over a limited fraction of the periphery of the second toothed element (3), and the first peripheral arc portion (4') of the first toothed element (2) is devoid of teeth and extends angularly over at least 60°.

15. The transmitting device according to claim 1, wherein the toothed peripheral arc portion (5) of the second toothed element (3) extends circumferentially over a limited fraction of the periphery of the second toothed element (3), and at most over 180°, and the first peripheral arc portion (4') of the first toothed element (2) is devoid of teeth and extends angularly over at least 60°.

16. The transmitting device according to claim 1, wherein the toothed peripheral arc portion (5) of the second toothed element (3) extends circumferentially over a limited fraction of the periphery of the second toothed element (3), and at most over 90°, and the first peripheral arc portion (4') of the first toothed element (2) is devoid of teeth and extends angularly over at least 90°.

17. The transmitting device according to claim 1, wherein the toothed peripheral arc portion (5) of the second toothed element (3) extends circumferentially over a limited fraction of the periphery of the second toothed element (3), and at most over 180°, and the first peripheral arc portion (4') of the first toothed element (2) extends angularly over at least 60°.

\* \* \* \* \*